United States Patent
Evans et al.

(10) Patent No.: US 8,561,928 B2
(45) Date of Patent: *Oct. 22, 2013

(54) ROTARY VALVE FOR BLOWING INSULATION MACHINE

(75) Inventors: Michael E. Evans, Granville, OH (US); Christopher M. Relyea, Columbus, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 850 days.

This patent is subject to a terminal disclaimer.

(21) Appl. No.: 12/717,173

(22) Filed: Mar. 4, 2010

(65) Prior Publication Data

US 2010/0314474 A1 Dec. 16, 2010

Related U.S. Application Data

(60) Provisional application No. 61/159,616, filed on Mar. 12, 2009.

(51) Int. Cl.
*B02C 23/20* (2006.01)

(52) U.S. Cl.
USPC ............................................. 241/60; 241/605

(58) Field of Classification Search
USPC .................................................. 241/60, 605
See application file for complete search history.

(56) References Cited

U.S. PATENT DOCUMENTS 7,712,690 B2 * 5/2010 Johnson et al. ................. 241/60
2008/0087751 A1 * 4/2008 Johnson et al. ................. 241/60

FOREIGN PATENT DOCUMENTS

GB 2124194 A 2/1984

* cited by examiner

*Primary Examiner* — Mark Rosenbaum
(74) *Attorney, Agent, or Firm* — Fraser Clemens Martin & Miller LLC; Charles F. Charpie

(57) ABSTRACT

A machine for distributing loosefill insulation is provided. The machine includes a shredding chamber having an outlet end. The shredding chamber includes a plurality of shredders configured to shred and pick apart the loosefill insulation. A discharge mechanism is mounted at the outlet end of the shredding chamber. The discharge mechanism is configured for distributing the loosefill insulation into an airstream. The discharge mechanism includes a shaft mounted for rotation within a housing. The shaft includes a plurality of vanes extending radially from the shaft. A plurality of seals is mounted to the shaft and to the vanes. The seals are configured to seal against the housing as the shaft rotates. A blower is configured to provide the airstream flowing through the discharge mechanism. The shaft and the vanes are a one-piece structure.

10 Claims, 11 Drawing Sheets

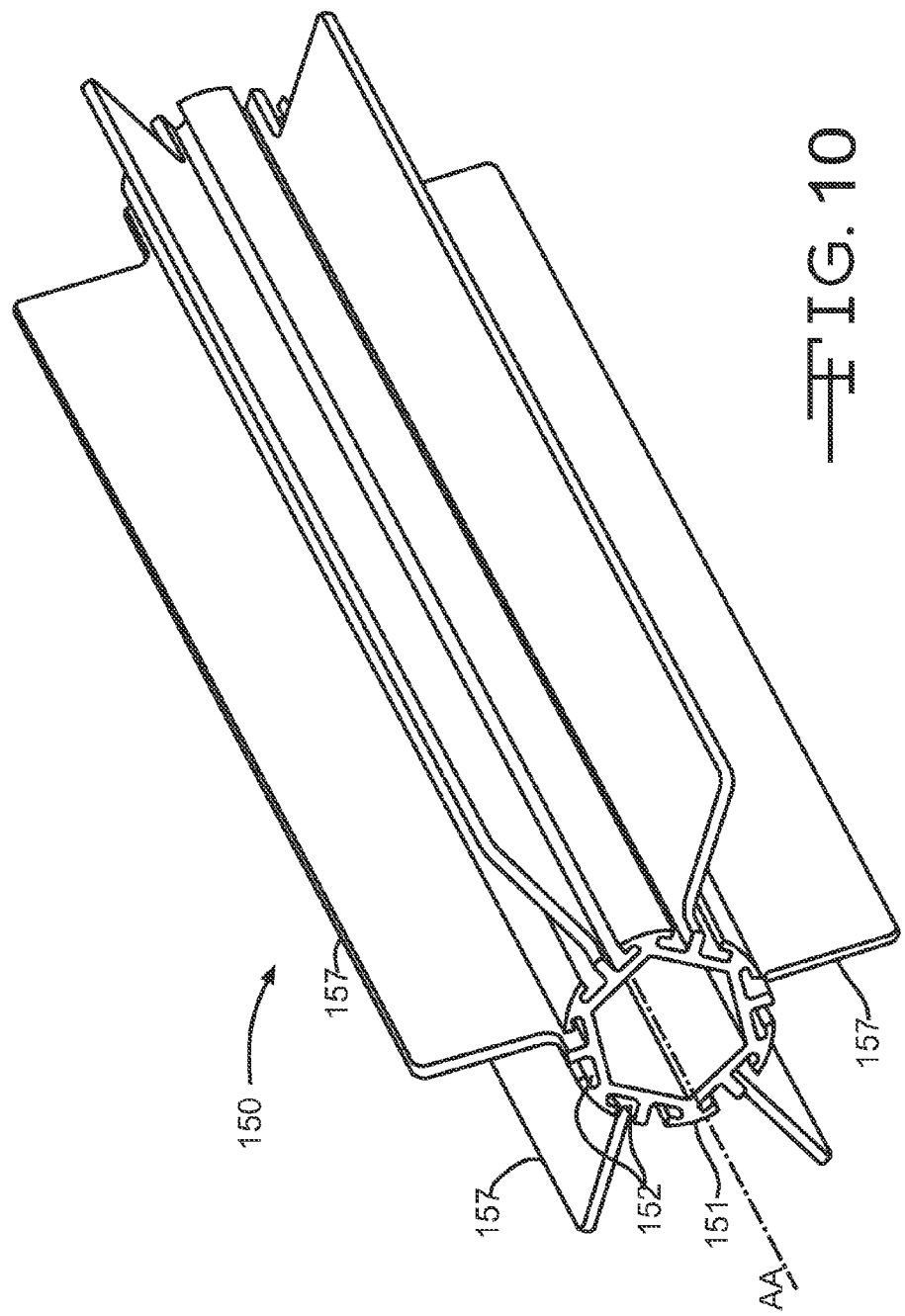

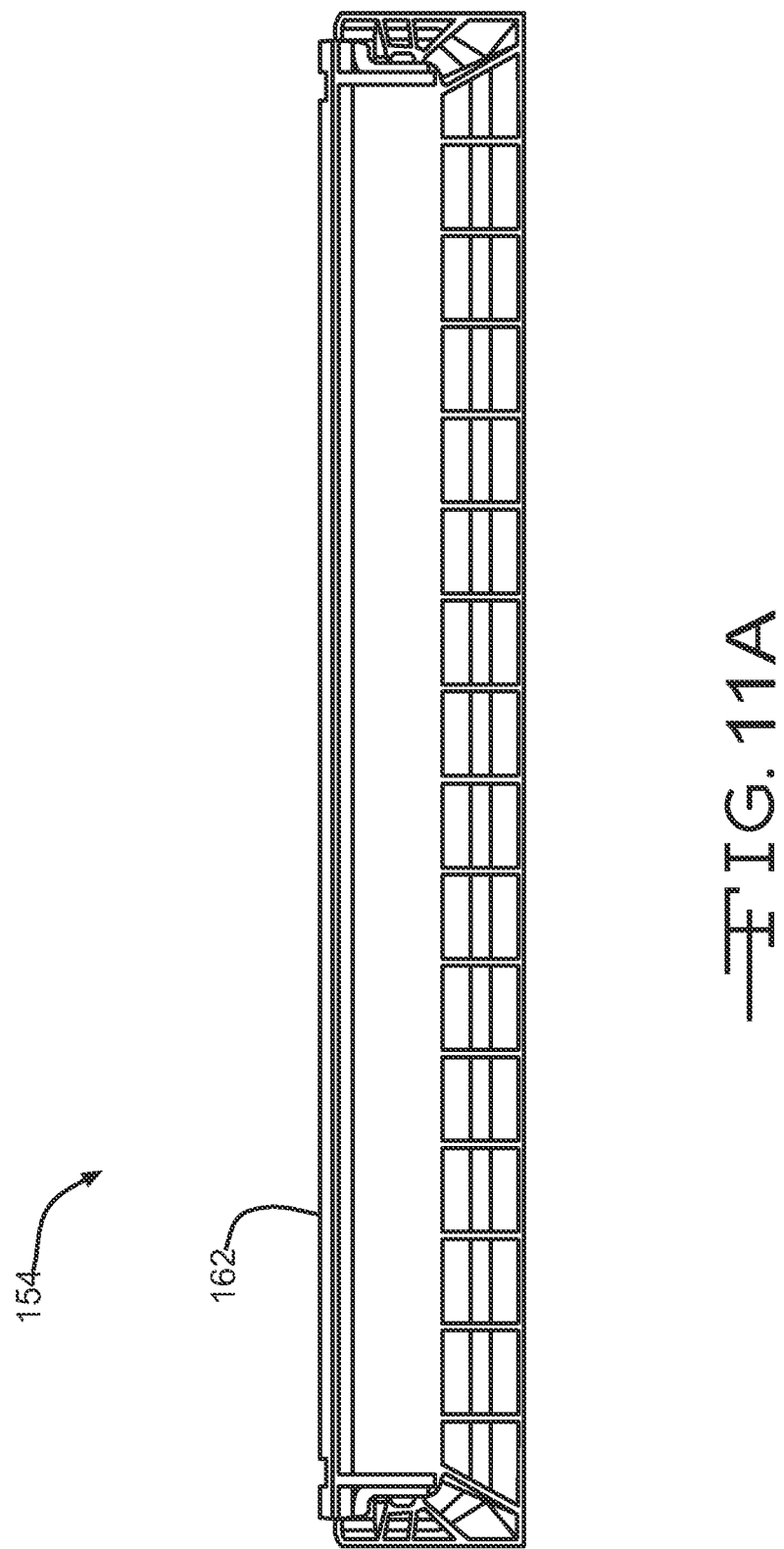

ROTARY VALVE FOR BLOWING INSULATION MACHINE

RELATED APPLICATIONS

This application claims the benefit of U.S. Provisional Application No. 61/159,616, filed Mar. 12, 2009, the disclosure of which is incorporated herein by reference.

TECHNICAL FIELD

This invention relates to loosefill insulation for insulating buildings. More particularly this invention relates to machines for distributing packaged loosefill insulation.

BACKGROUND OF THE INVENTION

In the insulation of buildings, a frequently used insulation product is loosefill insulation. In contrast to the unitary or monolithic structure of insulation batts or blankets, loosefill insulation is a multiplicity of discrete, individual tufts, cubes, flakes or nodules. Loosefill insulation is usually applied to buildings by blowing the insulation into an insulation cavity, such as a wall cavity or an attic of a building. Typically loosefill insulation is made of glass fibers although other mineral fibers, organic fibers, and cellulose fibers can be used.

Loosefill insulation, commonly referred to as blowing wool, is typically compressed in packages for transport from an insulation manufacturing site to a building that is to be insulated. Typically the packages include compressed loosefill insulation encapsulated in a bag. The bags are made of polypropylene or other suitable material. During the packaging of the loosefill insulation, it is placed under compression for storage and transportation efficiencies. Typically, the loosefill insulation is packaged with a compression ratio of at least about 10:1. The distribution of loosefill insulation into an insulation cavity typically uses a blowing insulation machine that feeds the loosefill insulation pneumatically through a distribution hose. Blowing insulation machines typically have a large chute or hopper for containing and feeding the loosefill insulation after the package is opened and the compressed loosefill insulation is allowed to expand.

It would be advantageous if blowing insulation machines could be improved to make them easier to use.

SUMMARY OF THE INVENTION

The above objects as well as other objects not specifically enumerated are achieved by a machine for distributing loosefill insulation. The machine includes a shredding chamber having an outlet end. The shredding chamber includes a plurality of shredders configured to shred and pick apart the loosefill insulation. A discharge mechanism is mounted at the outlet end of the shredding chamber. The discharge mechanism is configured for distributing the loosefill insulation into an airstream. The discharge mechanism includes a shaft mounted for rotation within a housing. The shaft includes a plurality of vanes extending radially from the shaft. A plurality of seals is mounted to the shaft and to the vanes. The seals are configured to seal against the housing as the shaft rotates. A blower is configured to provide the airstream flowing through the discharge mechanism. The shaft and the vanes are a one-piece structure.

According to this invention there is also provided a machine for distributing loosefill insulation. The machine includes a shredding chamber having an outlet end. The shredding chamber includes a plurality of shredders configured to shred and pick apart the loosefill insulation. A discharge mechanism is mounted at the outlet end of the shredding chamber. The discharge mechanism is configured for distributing the loosefill insulation into an airstream. The discharge mechanism includes a shaft mounted for rotation within a housing. The shaft includes a plurality of slots extending along a length of the shaft. A plurality of seals is mounted to the slots of the shaft and to the vanes. The seals are configured to seal against the housing as the shaft rotates. A blower is configured to provide the airstream flowing through the discharge mechanism. The slots have an T-shaped cross-sectional shape.

According to this invention there is also provided a machine for distributing loosefill insulation. The machine includes a shredding chamber having an outlet end. The shredding chamber includes a plurality of shredders configured to shred and pick apart the loosefill insulation. A discharge mechanism is mounted at the outlet end of the shredding chamber. The discharge mechanism is configured for distributing the loosefill insulation into an airstream. The discharge mechanism includes a shaft mounted for rotation within a housing. The shaft includes a plurality of vanes extending radially from the shaft. A plurality of seals is mounted to the shaft and to the vanes. The seals have a pocket and are configured to seal against the housing as the shaft rotates. A blower is configured to provide the airstream flowing through the discharge mechanism. The vanes are positioned within the pockets of the seals.

According to this invention there is also provided a method of assembling a discharge mechanism for a machine for distributing loosefill insulation. The method includes providing a shaft configured for rotation, the shaft having a plurality of vanes extending radially from the shaft and a plurality of slots extending a length of the shaft, providing a plurality of seals, the seals having a first end, a second end, a seal base and a pocket, folding the first end of the seal and simultaneously sliding the seal base of the seal into the slot of the shaft and the pocket of the seal over the vane such that the second end of the seal seats against the vane and unfolding the first end of the seal such that the first end of the seal snaps over an end of the vane.

Various objects and advantages of the blowing insulation machine will become apparent to those skilled in the art from the following detailed description of the preferred embodiment, when read in light of the accompanying drawings.

BRIEF DESCRIPTION OF THE DRAWINGS

FIG. 10 is a perspective view of a second embodiment of a valve shaft illustrating T-shaped slots.

FIG. 11A is a plan view of a second embodiment of a seal having a T-shaped seal base.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with embodiments of the present invention, blowing insulation machines incorporating rotary valves are provided. Generally, the rotary valves are configured to distribute finely conditioned loosefill insulation into an airstream. The rotary valves include a shaft mounted for rotation and a plurality of seals mounted to the shaft. The term "bag" as used herein, is defined to mean any enclosure used to encapsulate compressed loosefill insulation. The term "package", as used herein, is defined to mean the combination of compressed loosefill insulation encapsulated by a bag. The term "loosefill insulation", as used herein, is defined to any insulation materials configured for distribution in an airstream. The term "compressed", as used herein, is defined to mean condensing into a smaller space. The term "finely conditioned", as used herein, is defined to mean the shredding of loosefill insulation to a desired density prior to distribution into an airstream.

Figure 1:
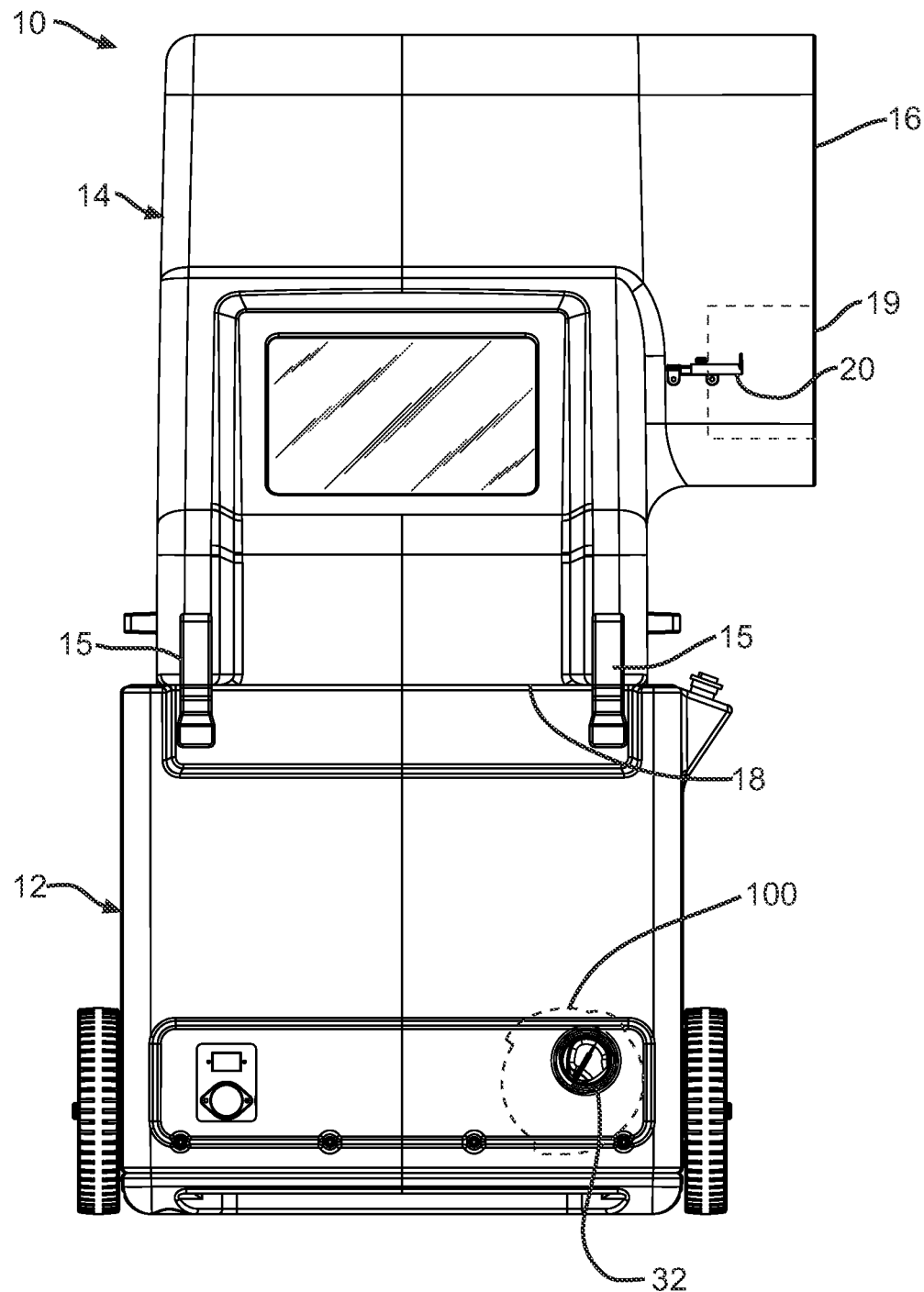
FIG. 1 is a front view in elevation of a blowing insulation machine.
Figure 2:
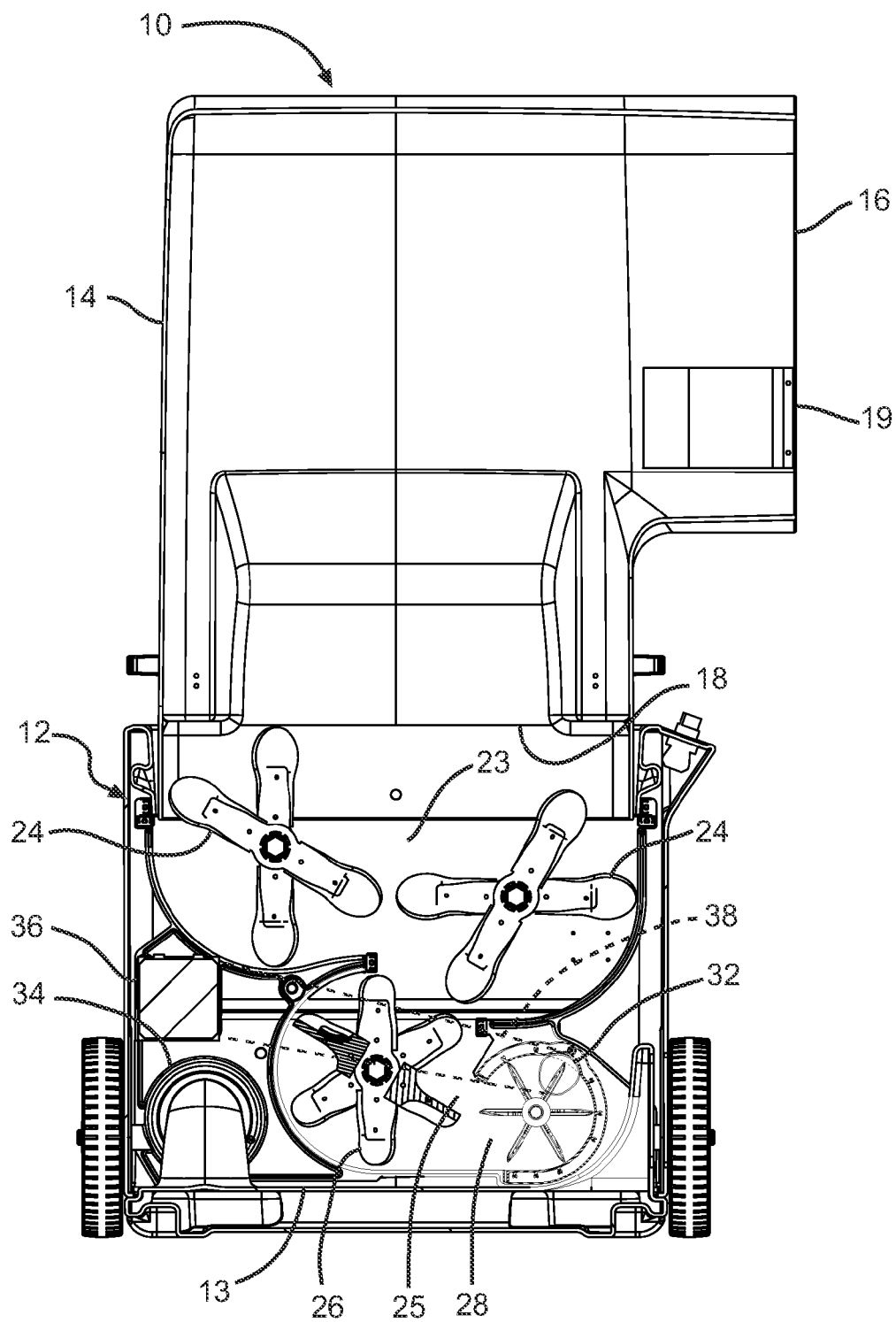
FIG. 2 is a front view, partially in cross-section, of the blowing insulation machine of FIG. 1.
Figure 3:
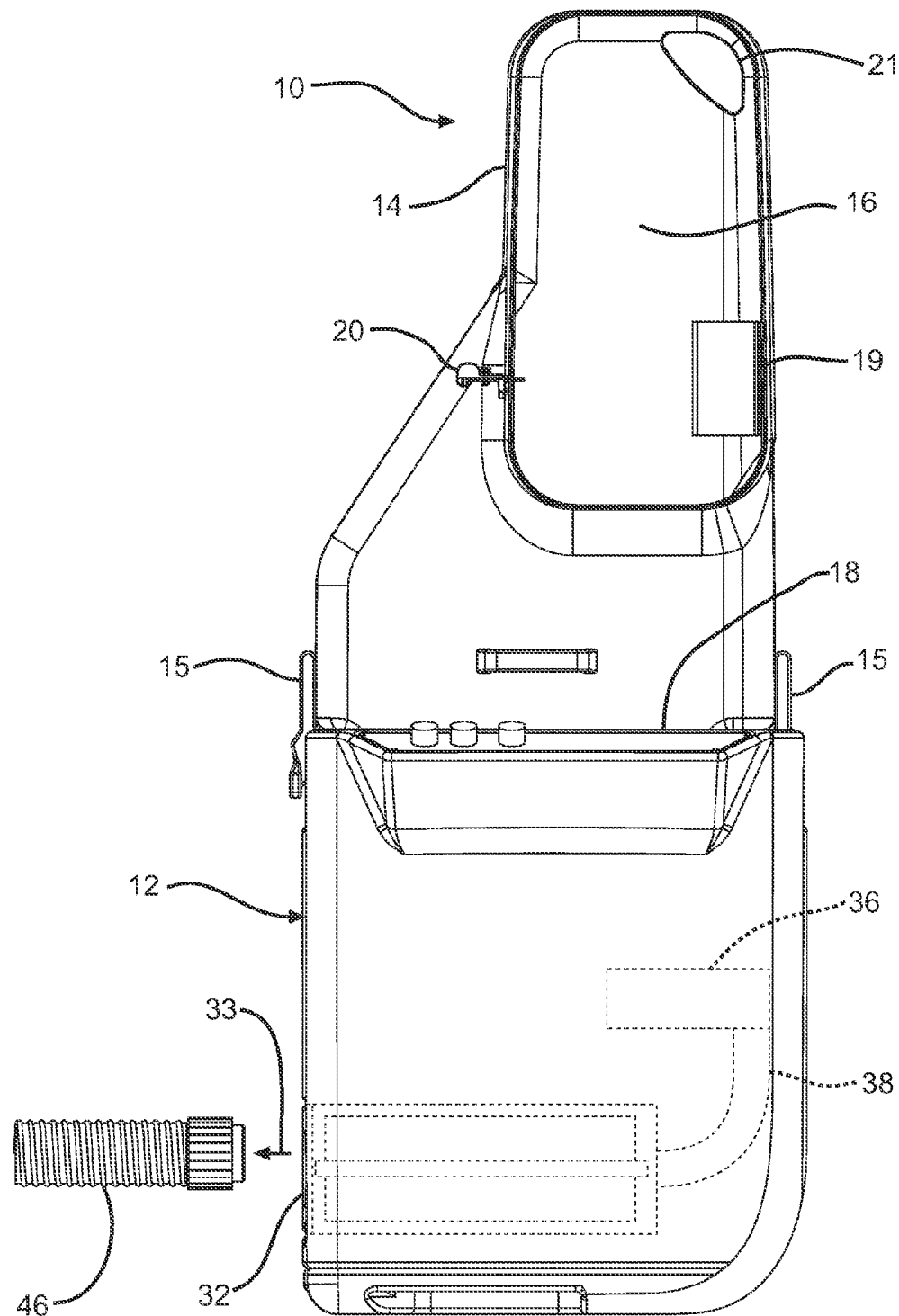
FIG. 3 is a side view in elevation of the blowing insulation machine of FIG. 1.

One example of a blowing insulation machine 10 configured for distributing compressed loosefill insulation into an airstream is shown in FIGS. 1-3. The blowing insulation machine 10 includes a lower unit 12 and a chute 14. The lower unit 12 is connected to the chute 14 by a plurality of fastening mechanisms 15 configured to readily assemble and disassemble the chute 14 to the lower unit 12. As further shown in FIGS. 1-3, the chute 14 has an inlet end 16 and an outlet end 18.

The chute 14 is configured to receive the loosefill insulation and introduce the loosefill insulation to a shredding chamber 23 as shown in FIG. 2. Optionally, the chute 14 includes a handle segment 21, as shown in FIG. 3, to facilitate ready movement of the blowing insulation machine 10 from one location to another. However, the handle segment 21 is not necessary to the operation of the blowing insulation machine 10.

As further shown in FIGS. 1-3, the chute 14 includes an optional guide assembly 19 mounted at the inlet end 16 of the chute 14. The guide assembly 19 is configured to urge a package of compressed loosefill insulation against a cutting mechanism 20, shown in FIGS. 1 and 3, as the package moves into the chute 14.

As shown in FIG. 2, the shredding chamber 23 is mounted at the outlet end 18 of the chute 14. In this embodiment, the shredding chamber 23 includes a plurality of low speed shredders 24 and an agitator 26. The low speed shredders 24 are configured to shred and pick apart the loosefill insulation as the loosefill insulation is discharged from the outlet end 18 of the chute 14 into the lower unit 12. Although the blowing insulation machine 10 is shown with a plurality of low speed shredders 24, any type of separator, such as a clump breaker, beater bar or any other mechanism that shreds and picks apart the blowing insulation can be used.

As further shown in FIG. 2, the shredding chamber 23 includes an agitator 26 configured to finely condition the loosefill insulation and for preparing the loosefill insulation for distribution into an airstream. In this embodiment as shown in FIG. 2, the agitator 26 is positioned beneath the low speed shredders 24. Alternatively, the agitator 26 can be disposed in any location relative to the low speed shredders 24, such as horizontally adjacent to, sufficient to receive the loosefill insulation from the low speed shredders 24. In the illustrated embodiment, the agitator 26 is a high speed shredder. Alternatively, any type of shredder can be used, such as a low speed shredder, clump breaker, beater bar or any other mechanism that finely conditions the loosefill insulation and prepares the loosefill insulation for distribution into an airstream.

In the embodiment illustrated in FIG. 2, the low speed shredders 24 rotate at a lower speed than the agitator 26. The low speed shredders 24 rotate at a speed of about 40-80 rpm and the agitator 26 rotates at a speed of about 300-500 rpm. In other embodiments, the low speed shredders 24 can rotate at speeds less than or more than 40-80 rpm and the agitator 26 can rotate at speeds less than or more than 300-500 rpm.

Referring again to FIG. 2, a discharge mechanism 28 is positioned adjacent to the agitator 26 and is configured to distribute the finely conditioned loosefill insulation into the airstream. In the illustrated embodiment, the finely conditioned loosefill insulation is driven through the discharge mechanism 28 and through a machine outlet 32 by an airstream provided by a blower 36 mounted in the lower unit 12. The airstream is indicated by an arrow 33 in FIG. 3. In other embodiments, the airstream 33 can be provided by another method, such as by a vacuum, sufficient to provide an airstream 33 driven through the discharge mechanism 28. In the illustrated embodiment, the blower 36 provides the airstream 33 to the discharge mechanism 28 through a duct 38 as shown in FIG. 2. Alternatively, the airstream 33 can be provided to the discharge mechanism 28 by another structure, such as by a hose or pipe, sufficient to provide the discharge mechanism 28 with the airstream 33.

The shredders 24, agitator 26, discharge mechanism 28 and the blower 36 are mounted for rotation. They can be driven by any suitable means, such as by a motor 34, or other means sufficient to drive rotary equipment. Alternatively, each of the shredders 24, agitator 26, discharge mechanism 28 and the blower 36 can be provided with its own motor.

In operation, the chute 14 guides the loosefill insulation to the shredding chamber 23. The shredding chamber 23 includes the low speed shredders 24 configured to shred and pick apart the loosefill insulation. The shredded loosefill insulation drops from the low speed shredders 24 into the agitator 26. The agitator 26 prepares the loosefill insulation for distribution into the airstream 33 by finely conditioning the loosefill insulation. The finely conditioned loosefill insulation exits the agitator 26 at an outlet end 25 of the shredding chamber 23 and enters the discharge mechanism 28 for distribution into the airstream 33 provided by the blower 36. The airstream 33, with the finely conditioned loosefill insulation, exits the machine 10 at the machine outlet 32 and flows through a distribution hose 46, as shown in FIG. 3, toward the insulation cavity, not shown.

Figure 4:
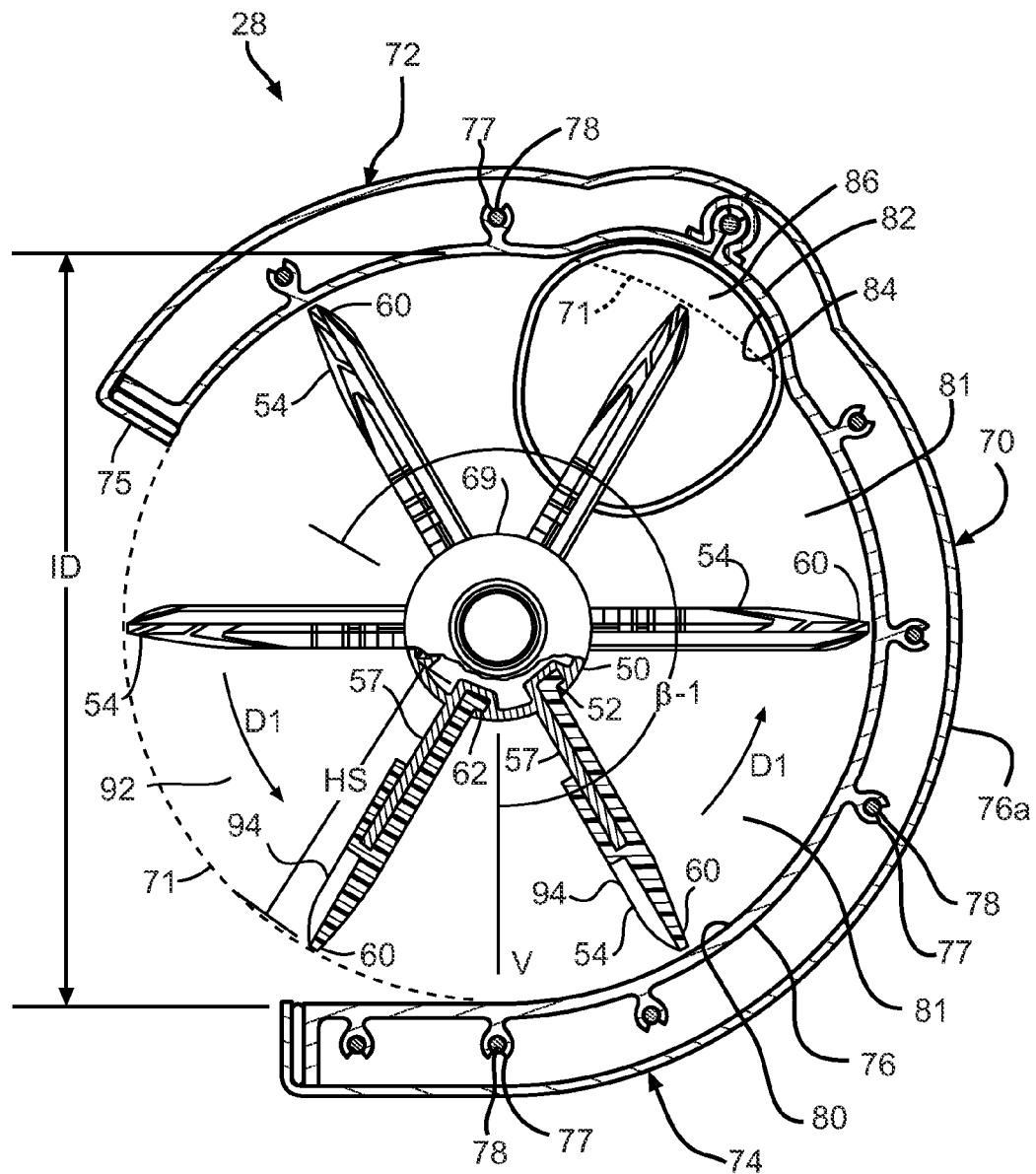
FIG. 4 is a cross-sectional view in elevation of a discharge mechanism of the blowing insulation machine of FIG. 1.

As previously discussed and as shown in FIG. 4, the discharge mechanism 28 is configured to distribute the finely conditioned loosefill insulation into the airstream 33. In the illustrated embodiment, the discharge mechanism 28 is a rotary valve. Alternatively the discharge mechanism 28 can be other desired mechanisms including staging hoppers, metering devices, and rotary feeders, sufficient to distribute the finely conditioned loosefill insulation into the airstream 33.

Referring again to FIG. 4, the discharge mechanism 28 includes a valve shaft 50 mounted for rotation within the discharge mechanism 28 and a plurality of seals 54 mounted to and supported by the valve shaft 50. Generally, the seals 54 are configured to seal against an inner housing wall 76 of a valve housing 70 as the valve shaft 50 rotates within the valve housing 70.

Figure 5:
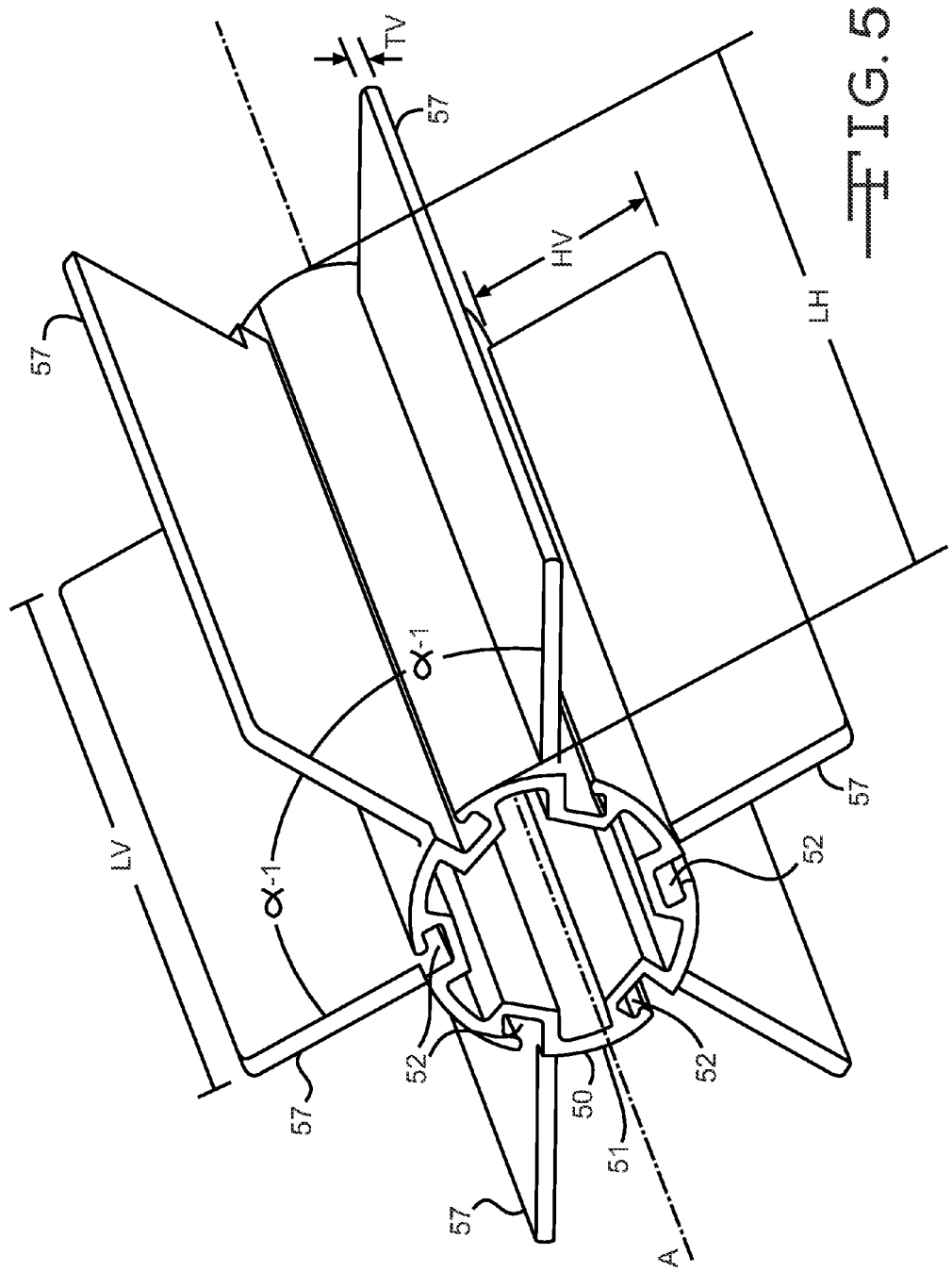
FIG. 5 is a perspective view of a valve shaft of the discharge mechanism of FIG. 4.

Referring now to FIG. 5, the valve shaft 50 includes a hub 51, a plurality of slots 52 formed to be integral with the hub 51 and a plurality of vanes 57 extending radially from the hub 51. In the illustrated embodiment, the hub 51 is a hollow structure having a substantially round cross-sectional shape and a major axis A. Alternatively, other cross-sectional shapes, such as a pentagonal cross-sectional shape, can be used. In the illustrated embodiment, the valve shaft 50 is made of steel, although the valve shaft 50 can be made of other desired materials, such as aluminum or plastic. As shown in FIG. 5, the hub 51 has a length LH. In the illustrated embodiment, the length LH of the hub 51 is approximately 16.0 inches. In other embodiments, the length LH of the hub 51 can be more or less than approximately 16.0 inches.

Referring again to FIG. 5, the slots 52 formed in the hub 51 have a generally L-shaped cross-sectional shape. As shown in FIG. 4, the slots 52 are configured to retain a corresponding L-shaped lower portion of the seals 54. While the slots 52 formed in the hub 51 are shown as having a generally L-shaped cross-sectional shape, it should be understood that the slots 52 can have other cross-sectional shapes corresponding to the cross-sectional shape of the lower portion of the seals 54. As shown in FIG. 5, each slot 52 extends along the length LH of the hub 51 in a direction substantially parallel to the major axis A.

Referring again to FIG. 5, the vanes 57 extend in radial directions from the hub 51. As shown in FIG. 4, the seals 54 mount to the vanes 57 in a manner such that each vane 57 supports a seal 54 as the valve shaft 50 rotates within the discharge mechanism 28. As shown in FIG. 5, each vane 57 extends along the length LH of the hub 51 in a direction generally parallel to the major axis A. The vanes 57 have a length LV and a thickness TV. In the illustrated embodiment, the length LV of the vanes 57 is approximately 16.5 inches and the thickness TV of the vanes 57 is approximately 0.25 inches. In other embodiments, the length LV of the vanes 57 can be more or less than approximately 16.5 inches and the thickness TV of the vanes 57 can be more or less than approximately 0.25 inches. As shown in FIG. 5, the valve shaft 50 includes a quantity of six vanes 57 spaced apart in a manner to form vane angles $\alpha$-1. In the illustrated embodiment, the vane angles $\alpha$-1 are 60°. Alternatively, the valve shaft 50 can include more or less than six vanes 57 thereby forming vane angles $\alpha$-1 of more or less than 60°. As shown in FIG. 5, the vanes 57 have a height HV. As will be explained in more detail below, the height HV of the vanes 57 corresponds to a portion of the height of the seals 54.

In the illustrated embodiment, the valve shaft 50 is formed such that the hub 51 and the vanes 57 are a one piece unit. In other embodiments, the valve shaft 50 can be formed such that the hub 51 and the vanes 57 are individual components joined together into an assembly.

Figure 7:
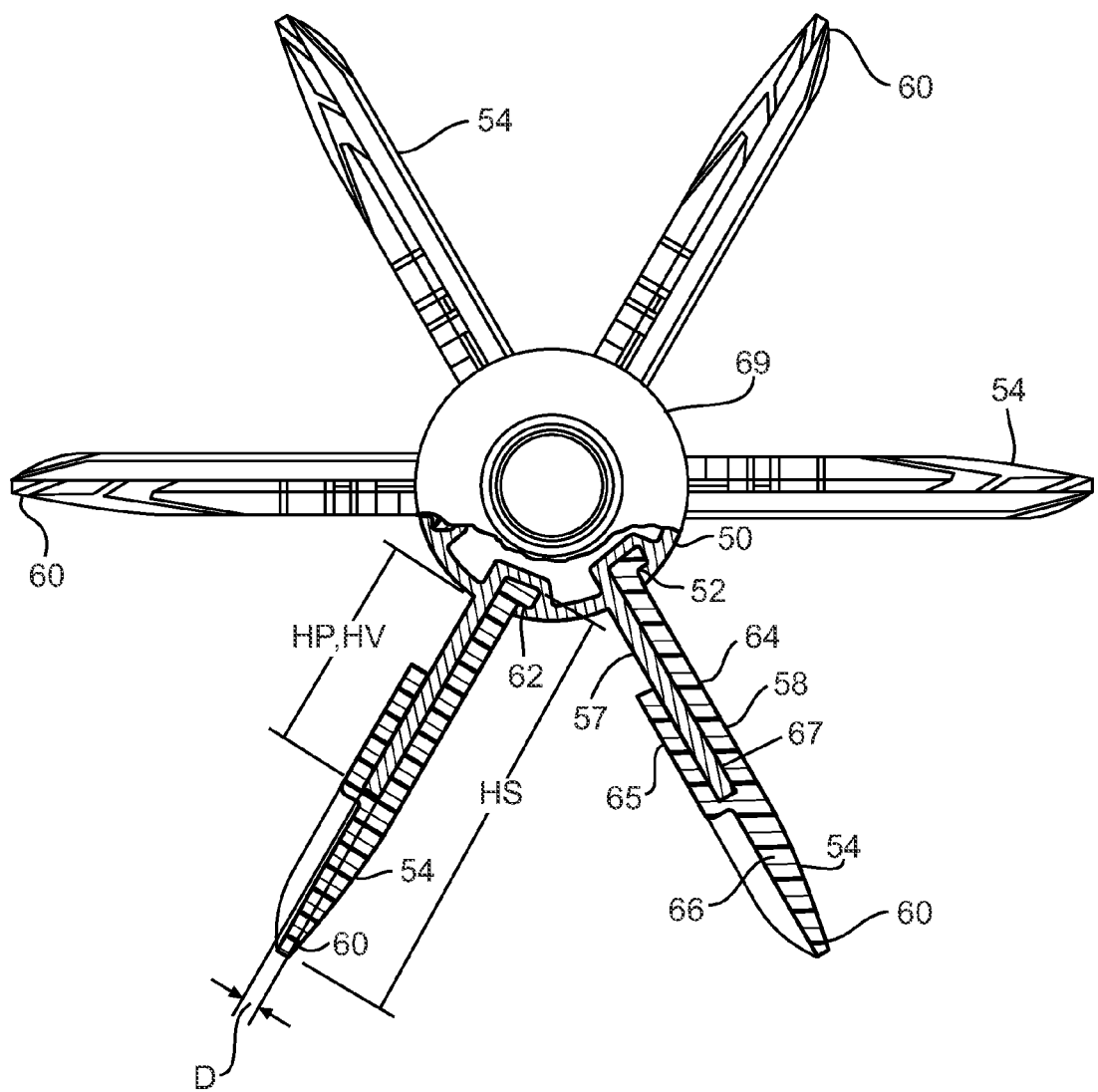
FIG. 7 is a front view in elevation, partially in cross-section, of the shaft and seals of the discharge mechanism of FIG. 4.

Referring now to FIG. 7, the plurality of seals 54 are generally assembled on the valve shaft 50 by seating them in the slots 52 of the valve shaft 50 and onto the vanes 57. As the valve shaft 50 rotates within the discharge mechanism 28, the seals 54 are supported by the vanes 57.

Figure 6:
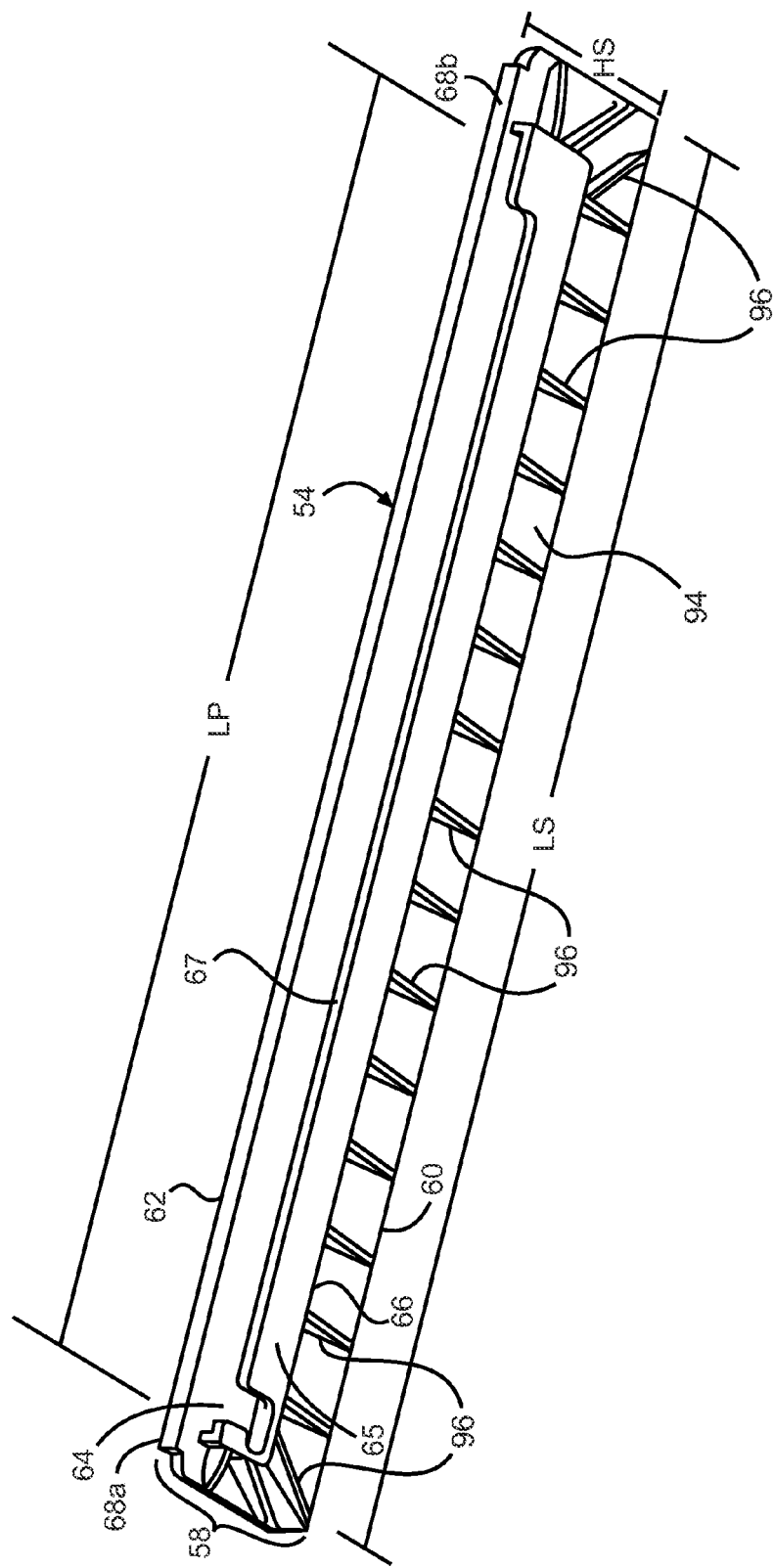
FIG. 6 is a perspective view of a seal of the discharge mechanism of FIG. 4.

Referring now to FIG. 6, each seal 54 has a length LS. In the illustrated embodiment, the length LS generally corresponds to the length LV of the vanes 57. Alternatively, the length LS of the seals 54 can be any desired length sufficient to seal within the discharge mechanism 28 as the discharge mechanism distributes the finely conditioned loosefill insulation into the airstream.

Referring again to FIG. 7, the seals 54 includes a seal body 58 positioned between a seal base 62 and a seal tip 60. In the illustrated embodiment, the seals 54 are formed as a one-piece member and are made from a flexible material, such as for example thermoplastic urethane. In other embodiments, the seals 54 can be assembled from multiple components and can be made of other desired materials sufficient to seal against the valve housing 70. In the illustrated embodiment, the seals 54 have a hardness rating in a range of from about 60 A to about 90 A as measured by a Durometer. The hardness rating of from about 60 A to about 90 A allows the seals 54 to efficiently seal against the valve housing 70 as the seals 54 rotate within the valve housing 70. Alternatively, the seals 54 can have a hardness rating over more than 90 A or less than 60 A.

As shown in FIGS. 4 and 5, the seal base 62 has an L-shaped cross-sectional shape that corresponds with the cross-sectional shape of the slots 52 within the valve shaft 50. While the seal base 62 is shown as having a generally L-shaped cross-sectional shape, it should be understood that the seal base 62 can have other cross-sectional shapes corresponding to the cross-sectional shape of the slots 52 within the valve shaft 50. As shown in FIG. 6, the seal base 62 extends substantially along the length LS of the seal 54.

Referring again to FIG. 7, the seal body 58 connects the seal base 62 with the seal tip 60. The seal body 58 includes a first portion 64, a second portion 65 and a third portion 66. The first portion 64 and the second portion 65 are spaced apart a distance D. Generally, the distance D corresponds to the thickness TV of the vanes 57. In the illustrated embodiment, the distance D is approximately 0.25 inches. Alternatively, the distance D can be more or less than approximately 0.25 inches such that the distance D generally corresponds the thickness TV of the vanes 57.

The first and second portions, 64 and 65 are connected by the third portion 66. As shown in FIG. 7, the third portion 66 extends from the first and second portions, 64 and 65, to the seal tip 60. The first, second and third portions, 64, 65 and 66, cooperate to form a pocket 67. Each pocket 67 has a height HP, as shown in FIG. 7, and a length LP, as shown in FIG. 6. In the illustrated embodiment, the height HP of the pockets 67 are substantially the same as the height HV of the vanes 57. In other embodiments, the height HP of the pockets 67 can be longer or shorter than the height HV of the vanes 57. In the illustrated embodiment, the length LP of the pocket 67 is substantially the same as the length LV of the vanes 57. In other embodiments, the length LP of the pocket 67 can be longer or shorter than the length LV of the vanes 57.

Referring now to FIG. 6, the third portion 66 of the seals 54 has a rear area 94. The rear area 94 is configured to provide support for the seal tips 60 as the seals 54 rotate within the discharge mechanism 28. In the illustrated embodiment, the rear area 94 of the third portion 66 has a plurality of ribs 96 spaced apart along the length LS of the seals 54. In other embodiments, the rear area 94 of the third portion 66 of the seals 54 can include any desired structure, device or mechanism sufficient to provide support for the seal tips 60 as the seals 54 rotate within the discharge mechanism 28.

Referring again to FIG. 7 and as discussed above, the vanes 57 support the seals 54 as the valve shaft 50 rotates within the discharge mechanism 28. Accordingly, the height HV of the vanes 57 corresponds to the height HS of the seals 54. In the illustrated embodiment, the height HV of the vanes 57 is approximately two-thirds of the height HS of the seals 54. In other embodiments, the height HV of the vanes 57 can be more or less than approximately two-thirds of the height HS of the seals 54.

Referring again to FIG. 6, the seal 54 has a seal first end 68a and a seal second end 68b. In operation, the seals 54 are installed on the valve shaft 50 according to the following steps. First, the first end 68a of a seal 54 is folded in a direction sufficient to allow the seal base 62 of the seal 54 to be slid into a slot 52 of the valve shaft 50 at the same time as the vane 57 is positioned within the pocket 67. The seal 54 is slid onto the valve shaft 50 until the second end 68b of the seal 54 seats against vane 57 and the vane 57 is completed positioned within the pocket 67. Next, the first end 68a of the seal 54 is returned from the folded position thereby allowing the first end 68a of the seal 54 to snap over the end of the vane 57. This same installation procedure is followed until all of the vanes 57 have been covered by seals 54. As shown in FIGS. 4 and 7, in a final step, the end of the valve shaft 50 is covered by a shaft cap 69. The shaft cap 69 is configured to cover slots 52 thereby retaining the installed seals 54 in the valve shaft 50. In the illustrated embodiment, the shaft cap 69 is pressed into the hollow end of the valve shaft 50. In other embodiments, the shaft cap 69 can be connected to the valve shaft 50 with any desired mechanism, fixture or device.

While the embodiment shown in FIGS. 4 and 7 illustrate a combination of slots 52 and vanes 57 configured to fasten and retain the seals 54 to the valve shaft 50, it should be understood that other desired structures, devices and mechanisms, such as for example clamps, clips and bolts can be used to fasten and retain the seals 54 to the valve shaft 50.

Referring again to FIG. 4, the seals 54, assembled on the valve shaft 50, rotate within the valve housing 70 in a counter-clock wise direction as indicated by the arrows D1. In the illustrated embodiment, the valve housing 70 is made from an aluminum extrusion, although the valve housing 70 can be made from other desired materials, including brass or plastic, sufficient to form a housing within which the seals 54 rotate. In the illustrated embodiment as shown in FIG. 4, the valve housing 70 includes a top housing segment 72 and a bottom housing segment 74. In other embodiments, the valve housing 70 can be made of a single segment or the valve housing 70 can be made of more than two segments.

As shown in FIG. 4, the valve housing includes the inner housing wall 76 and an optional outer housing wall 76a. The inner housing wall 76 has an inner housing surface 80. Optionally, the inner housing surface 80 can have a coating to provide a low friction and extended wear surface. One example of a low friction coating is a chromium alloy although other materials may be used. Alternatively, the inner housing surface 80 may not be coated with a low friction and extended wear surface.

The top housing segment 72 and the bottom housing segment 74 are attached to the lower unit 12 by housing fasteners 78. In the illustrated embodiment, the housing fasteners 78 are bolts extending through mounting holes 77 disposed in the top housing segment 72 and the bottom housing segment 74. In other embodiments, the top housing segment 72 and the bottom housing segment 74 can be attached to the lower unit 12 by other desired fasteners, such as clips or clamps, or by other fastening methods including sonic welding or adhesive.

As shown in FIG. 4, the valve housing 70 is curved and extends to form a segment having a generally circular shape. The curved portion of the valve housing 70 has an end 75. A valve housing wrap angle $\beta$-1 extends from a substantially vertical axis V centered on the valve shaft 50 to the end 75 of the valve housing 70. In the illustrated embodiment, the valve housing wrap angle $\beta$-1 is approximately 240°. Alternatively, the valve housing 70 can form other circular segments having other desired valve housing wrap angles $\beta$-1.

The generally circular shape of the valve housing 70 has an approximate inside diameter ID which is approximately the same diameter of an arc 71 formed by the seal tips 60 of the rotating seals 54. In operation, the seal tips 60 of the seals 54 seal against the inner housing surface 80 such that finely conditioned loosefill insulation entering the discharge mechanism 28 is contained within a wedge-shaped space 81 defined by adjacent seals 54 and the inner housing surface 80. The containment of the finely conditioned loosefill insulation within adjacent seals 54 will be discussed in more detail below.

Figure 8:
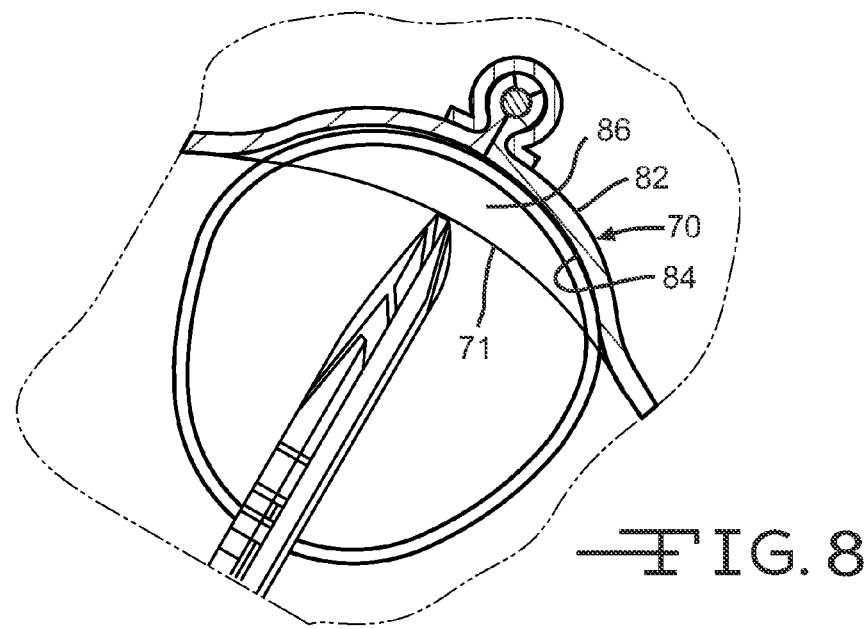
FIG. 8 is a cross-sectional view in elevation of the airstream and eccentric region of the discharge mechanism of FIG. 4.

As shown in FIGS. 4 and 8, the valve housing 70 includes an eccentric segment 82. The eccentric segment 82 extends from or bulges out from the circular sector of the top housing segment 72 and the bottom housing segment 74. The eccentric segment 82 can have any desired cross-sectional shape.

The eccentric segment 82 includes an inner eccentric surface 84. As shown in FIGS. 4 and 8, the eccentric segment 82 forms an eccentric region 86 which is defined as the area bounded by the inner eccentric surface 84 and the arc 71 formed by the seal tips 60 of the rotating seals 54. The eccentric region 86 is positioned within the airstream 33 flowing through the discharge mechanism 28. In operation, as the seals 54 rotate into the airstream 33, the seal tip 60 of the seal 54 becomes spaced apart from the inner housing surface 80 of the valve housing 70. As the seal 54 further rotates within the eccentric region 86, the airstream 33 flows along the seal tip 60, thereby forcing any particles of blowing wool caught on the seal tip 60 to be blown off. This clearing of the seals 54 assists in preventing a buildup of finely conditioned loosefill insulation from forming on the seals 54. While the embodiments illustrated in FIGS. 4 and 8 illustrate the eccentric region 86 as being positioned in an upper right quadrant of the discharge mechanism 28, it should be appreciated that the eccentric region 86 can be positioned in any suitable location within the discharge mechanism 28.

Referring again to FIG. 4, the top and bottom housing segments 72 and 74 do not completely enclose the valve housing 70, thereby forming a side inlet 92. The side inlet 92 is configured to receive the finely conditioned loosefill insulation as it is fed from the agitator 26. Positioning the side inlet 92 of the discharge mechanism 28 at the side of the discharge mechanism 28 allows finely conditioned loosefill insulation to be fed approximately horizontally into the discharge mechanism 28. Horizontal feeding of the loosefill insulation from the agitator 26 to the discharge mechanism 28 is defined to include the feeding of loosefill insulation in a direction that is substantially parallel to a floor 13 of the lower unit 12 as best shown in FIG. 2. Feeding finely conditioned loosefill insulation horizontally into the discharge mechanism 28 allows the discharge mechanism 28 to be positioned at a lower location within the lower unit 12, thereby allowing the blowing insulation machine 10 to be more compact. In the illustrated embodiment, the agitator 26 is positioned to be adjacent to the side inlet 92 of the discharge mechanism 28. In other embodiments, a low speed shredder 24, or a plurality of shredders 24 or agitators 26, or other mechanisms can be positioned adjacent to the side inlet 92, such that finely conditioned loosefill insulation is fed horizontally into the side inlet 92.

As discussed in detail above, the seals 54 are assembled on the valve shaft 50 by seating them in the slots 52 of the valve shaft 50 and around the vanes 57. This configuration of seals 54 and valve shaft 50 provides significant benefits in the operation of the blowing insulation machine 10. Although all benefits may not be present in all embodiments.

First, the seal 54 and valve shaft 50 configuration provides for an effective rotating sealing assembly within the discharge mechanism 28 while having a minimum of component parts. As discussed above, the seals 54 are one-piece components and the valve shaft 50 is a one piece component. Accordingly, the seal 54 and valve shaft 50 embodiment illustrated in FIGS. 4 and 7 is assembled with a total quantity of seven component parts. The minimal number of components provides for reduced component costs, reduced assembly time and cost and reduced repair time and cost.

Second, the support of the seals 54 by the vanes 57 extending radially from the hub 51, provides added support to the seals 54. The added support provided to the seals 54 allows the seals 54 to better tolerate unfavorable operating conditions within the discharge mechanism 28. Examples of unfavorable operating conditions within the discharge mechanism include ingested foreign objects, burrs on the inner housing surface 80 and insufficiently shredded and conditioned loosefill insulation. Additional, it is believed the support provided to the seals 54 by the vanes 57 will greatly extend the operating life of the seals 54 by better supporting the deflection of the seal tips 60.

Figure 9:
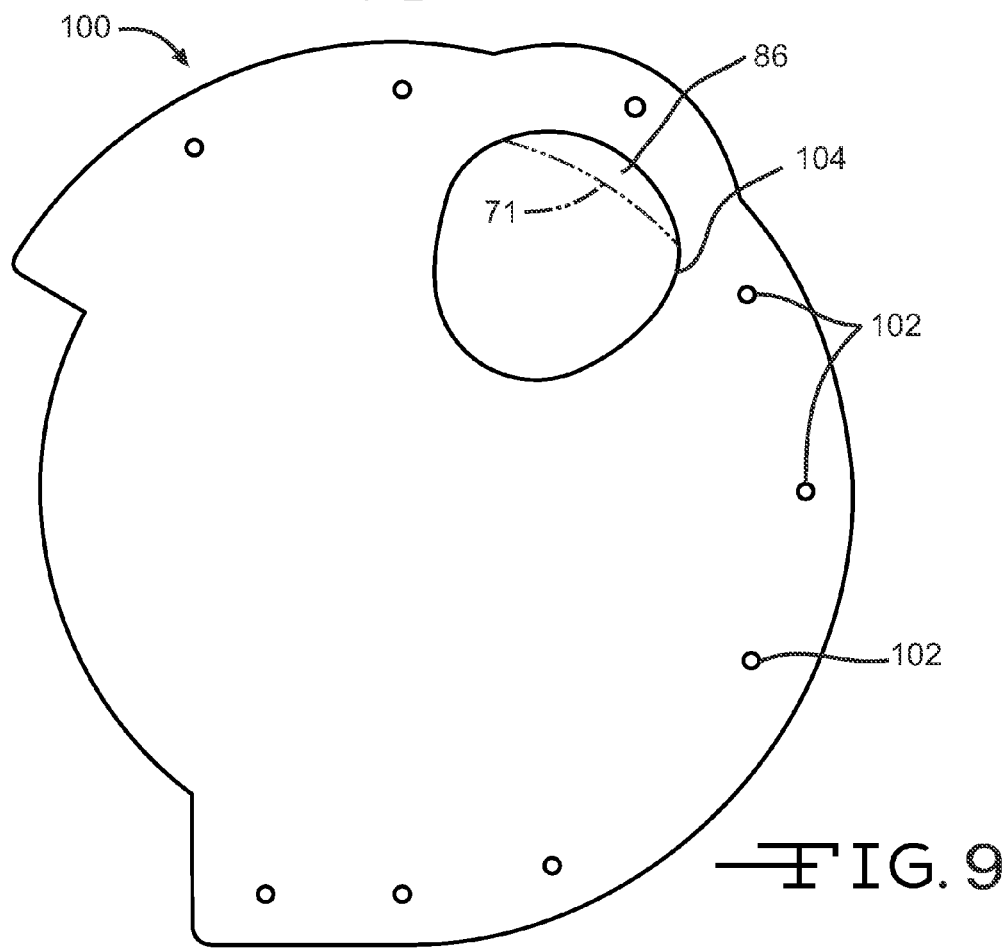
FIG. 9 is a front view in elevation of an end outlet plate of the blowing insulation machine of FIG. 1.

As shown in FIGS. 1 and 9, the discharge mechanism 28 further includes an end outlet plate 100 as shown in FIGS. 1 and 7. The end outlet plate 100 is configured to cover the outlet end of the discharge mechanism 28 at the machine outlet 32. The end outlet plate 100 includes optional mounting holes 102 and an airstream opening 104. In the illustrated embodiment, the airstream opening 104 includes the eccentric region 86. In other embodiments, the airstream opening 104 can be any shape sufficient to discharge finely conditioned loosefill insulation from the discharge mechanism 28.

Figure 11B:
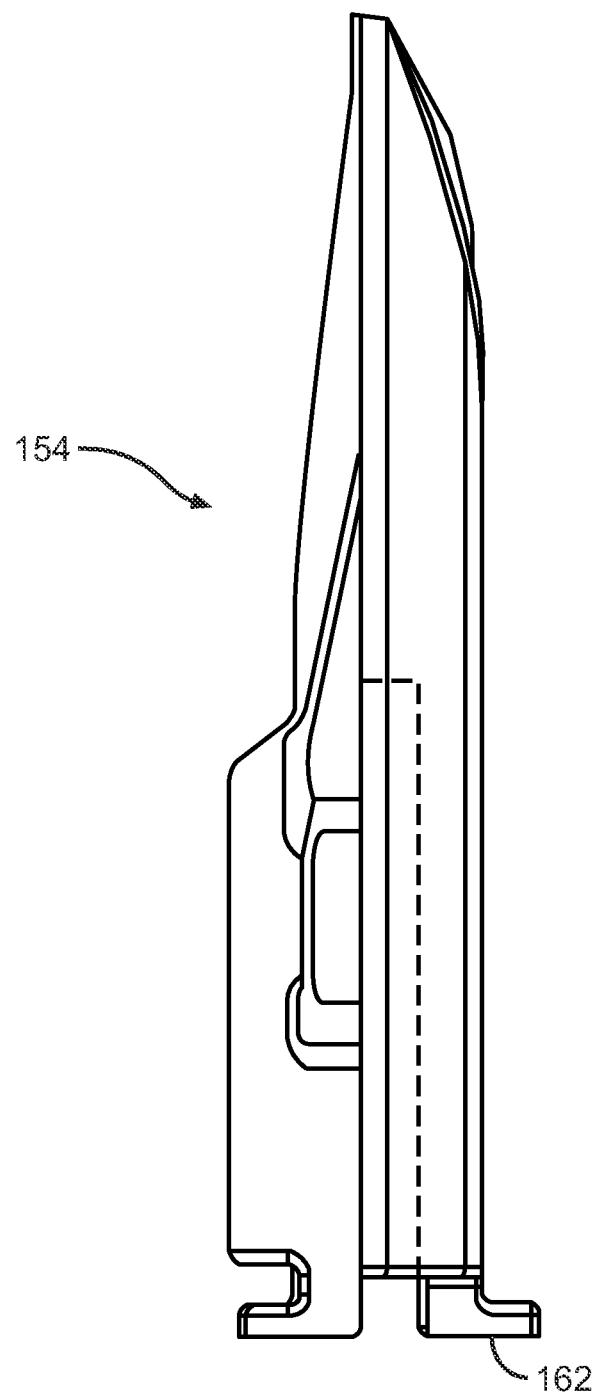
FIG. 11B is a side view in elevation of the seal of FIG. 11A.

While the embodiment shown in FIGS. 4-7 illustrates one combination of seals having L-shaped seal bases supported by a shaft having vanes and corresponding L-shaped slots, it should be appreciated that other combinations of shafts and vanes can be used. Referring now to FIGS. 10, 11a and 11b, another embodiment of a combination of seals and a shaft having slots and vanes is illustrated.

Referring first to FIG. 10, a valve shaft 150 is illustrated. The valve shaft 150 is mounted for rotation within a discharge mechanism (not shown) and configured to support a plurality of seals 154 as shown in FIGS. 11A and 11B. The valve shaft 150 includes a hub 151, a plurality of slots 152 formed to be integral with the hub 51 and a plurality of vanes 157 extending radially from the slots 152. In the illustrated embodiment, the valve shaft 150 is configured for rotation in the discharge mechanism 28 discussed above and illustrated in FIGS. 2 and 4. In other embodiments, the valve shaft 150 can be configured for rotation in other discharge mechanisms (not shown).

In the embodiment illustrated in FIG. 10, the hub 151 is the same as, or similar to, the hub 51 discussed above and illustrated in FIG. 5. However, in other embodiments the hub 151 can be different than the hub 51.

Referring again to FIG. 10, the slots 152 formed in the hub 151 are the same as, or similar to, the slots 52 discussed above and illustrated in FIG. 5 with the exception that the slots 152 have a generally T-shaped cross-sectional shape. The slots 152 are configured to receive a corresponding T-shaped lower portion 162 of the seals 154 as shown in FIG. 11B. Referring again to FIG. 10, each slot 152 extends along the hub 151 in a direction substantially parallel to the major axis AA.

As shown in FIG. 10, the vanes 157 extend in radial directions from the slots 152. The vanes 157 are configured in a manner such that each vane 157 supports a seal 154 as the valve shaft 150 rotates in the discharge mechanism. As shown in FIG. 10, each vane 157 extends along the length hub 151 in a direction generally parallel to the major axis AA. In the illustrated embodiment, the vanes 157 are the same as, or similar to, the vanes 57 described above and illustrated in FIG. 5. Alternatively, the vanes 157 can be different from the vanes 57.

In the illustrated embodiment, the valve shaft 150 is formed such that the hub 151 and the vanes 157 are a one piece unit. In other embodiments, the valve shaft 150 can be formed such that the hub 151 and the vanes 157 are individual components joined together to form an assembly.

Referring now to FIGS. 11A and 11B, in a similar manner as discussed above, the seals 154 are configured to seal against an inner housing wall of a valve housing as the valve shaft 150 rotates within the valve housing.

Generally, the seals 154 are the same as, or similar to, the seal 154 discussed above and illustrated in FIGS. 6 and 7 with the exception that the seals 154 include a seal base 162 having a T-shaped cross-sectional shape that corresponds with the cross-sectional shape of the slots 152 within the valve shaft 150. While the seal base 162 is shown as having a generally T-shaped cross-sectional shape, it should be understood that the seal base 162 can have other cross-sectional shapes corresponding to the cross-sectional shape of the slots 152 within the valve shaft 150. As shown in FIG. 11A, the seal base 162 extends substantially along the length of the seal 154.

In the illustrated embodiment, the plurality of seals 154 are assembled on the valve shaft 150 in the same, or similar manner, to the method of assembling the seals 54 to the valve shaft 50 discussed above. However, the plurality of seals 154 can be assembled to the valve shaft 150 in other manners. Once the plurality of seals 154 are assembled to the valve shaft 150, the vanes 157 support the seals 154 as the valve shaft 150 rotates within the discharge mechanism.

The principle and mode of operation of this blowing insulation machine have been described in certain embodiments. However, it should be noted that the blowing insulation machine may be practiced otherwise than as specifically illustrated and described without departing from its scope.

What is claimed is:

1. A machine for distributing loosefill insulation, the machine comprising:
   a shredding chamber having an outlet end, the shredding chamber including a plurality of shredders configured to shred and pick apart the loosefill insulation;
   a discharge mechanism mounted at the outlet end of the shredding chamber, the discharge mechanism configured for distributing the loosefill insulation into an airstream, the discharge mechanism including a valve shaft mounted for rotation within a housing, the valve shaft including a hub and a plurality of vanes extending radially from the hub, each vane having one or more adjacent slots formed integral to the hub, each of the slots positioned below the outer surface of the hub, a plurality of seals being mounted to the vanes such that seal bases seat in the slots, the seals being configured to seal against the housing as the shaft rotates, and
   a blower configured to provide the airstream flowing through the discharge mechanism;
   wherein the shaft and the vanes are a one-piece structure.

2. The machine of claim 1, wherein the vanes have a height and the seals have a height, wherein the height of the vanes is approximately two-thirds the height of the seals.

3. The machine of claim 1, wherein the shaft has a hub, wherein the hub has a plurality of slots.

4. The machine of claim 3, wherein the slots have a T-shaped cross-sectional shape.

5. The machine of claim 4, wherein the seals have a seal base, wherein the seal base has a T-shaped cross-sectional shape.

6. The machine of claim 5, wherein the T-shaped cross-sectional shape of the seal base corresponds to the T-shaped cross-sectional shape of the slots.

7. The machine of claim 1, wherein the seals have a first portion, a second portion and a third portion, and wherein the first portion, second portion and third portion cooperate to form a pocket.

8. The machine of claim 7, wherein the vanes are positioned within the pockets.

9. The machine of claim 7, wherein the shaft has a length and the vanes have a length, wherein the length of the vanes is less than the length of the shaft.

10. The machine of claim 9, wherein the pocket has a length that is approximately the same length as the length of the vanes.

* * * * *